US005224013A

United States Patent [19]

Pagliuca

[11] Patent Number: 5,224,013

[45] Date of Patent: Jun. 29, 1993

[54] MINIATURE STATION PROTECTOR MODULES

[75] Inventor: Emanuel J. Pagliuca, Patchogue, N.Y.

[73] Assignee: TII Industries Inc., Caprague, N.Y.

[21] Appl. No.: 634,747

[22] Filed: Dec. 26, 1990

[51] Int. Cl.[5] .......... H02H 3/22

[52] U.S. Cl. .......... 361/119; 361/124; 361/129; 337/32

[58] Field of Search .......... 361/119, 117, 120, 111, 361/56, 91, 124, 129; 337/32

[56] References Cited

U.S. PATENT DOCUMENTS

| | | | |
|---|---|---|---|
| 4,603,368 | 7/1986 | Pagliuca | 361/119 |
| 4,675,778 | 6/1987 | Cwirzen | 361/119 |
| 4,710,846 | 12/1987 | Heisinger | 361/119 |
| 4,866,562 | 9/1989 | Jones | 361/119 |

*Primary Examiner*—Todd E. DeBoer
*Attorney, Agent, or Firm*—Sachs & Sachs

[57] ABSTRACT

A miniature station protector module for communication systems includes a hollow housing into which is disposed a pair of line terminals with a ground terminal therebetween. The line terminals extend into the hollow housing and include thereon a back-up surge arrester in axial alignment with each of the terminals, either a three terminal surge arrester or a pair of two terminal arresters may be utilized having one electrode connected to the ground terminal with the other electrodes being connected to the line terminals. The holding assembly for the surge protectors includes a ground bracket which is adapted to receive the surge protectors and includes a thermally sensitive material disposed between the surge arrester electrodes and the ground connection thereby providing both overheat protection by positively shorting the line terminals to ground if the overvoltage protection should overheat as well as providing back-up surge arrester protection by means of a back-up air gap provided by a dielectric disposed between the line terminals and the ground connection.

25 Claims, 4 Drawing Sheets

MINIATURE STATION PROTECTOR MODULES

BACKGROUND OF THE INVENTION

1. Field of Invention

The present invention relates to overload protectors for communications systems, and in particular, to overvoltage protection devices having back-up air gap protection.

2. Discussion of the Relevant Art

In communication systems, such as telephone systems, it is necessary to position overload protectors at various positions to protect sensitive parts of the system to protect equipment attached to the line from lightning strikes or other cases of overvoltage appearing on the communication lines. Typically these overvoltage protection devices incorporated the carbon block type which provided a parallel air gap so that if the gas tube should fail some type of back-up air gap would be provided until the gas tube could be replaced. However, the carbon block protector during normal operation on the communication line causes static to appear on the line and thus, later protection devices used thermally sensitive plastics which were assembled with spring pressure on them and thus when overheated would yield and short the terminal line to ground.

With the inherent desire to protect the communication equipment several different types of protectors have been used over the years, each including thermally active members which when overheated causes the line terminals to short to ground. Initially the thermally sensitive material was a low temperature melting solder pellet, which when melted because of extreme heat caused by an overvoltage, would permit the housing in some manner to short the line terminal to ground. Further improvements in the state of the art replaced the solder pellet used with the gas filled tube. Still further improvements of the protection devices, which proved to be more reliable utilized a back-up air gap together with the thermally sensitive material used for overheating protection in the assemblies.

However, all of these devices known in the prior art required that the technician in replacing any of the components after lightning strike or overvoltage condition to carefully replace the components as it was originally assembled so that the protection would be restored. This type of assembly work performed in the field proved to be a handicap and thus it was found more desirable to provide a device which is completely sealed and when it has provided its useful protection is just thrown away and replaced with a new unit. This, of course, became feasible only with the advent of inexpensive thermally sensitive plastics and a new type of construction which reduced the cost of the protection device.

Therefore, it is an object of the present invention to provide a miniature station protector module for communication systems which is completely sealed and may be disposed of once it has served its purpose for protecting the communication line.

It is another object of the present invention to provide a miniature station protector module which combines all of the features of the earlier type devices including fail-safe shorting, with a back-up air gap arrangement that is integral, axially aligned with the line terminals, highly stable and efficient, as well as, being inexpensive to manufacture.

It is still a further object of the present invention to provide a miniature station protector module which is capable of using a gas tube surge protector device as well as, solid state protector devices.

The foregoing and other objects and advantages will appear from the description to follow. In the description reference is made to the accompanying drawing which forms a part hereof, and in which is shown by way of illustration specific embodiments in which the invention may be practiced. These embodiments will be described in sufficient detail to enable those skilled in the are to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims. Like reference characters have been utilized to designate like or corresponding components in the alternative embodiment of the invention in order for the reader to better understand the invention.

SUMMARY OF THE INVENTION

A miniature station protector module for communication systems, according to the principles of the present invention comprises a hollow housing having a top surface and an open bottom. A pair of line terminals and a ground terminal are disposed in the housing top surface and extend into the hollow housing, the ground terminal being intermediate the pair of line terminals. A back-up surge arrester is disposed on each one of the pair of line terminals in axial alignment therewith.A holding bracket assembly is affixed to the ground terminal within the hollow housing and is adapted to receive the surge arrester. A surge arrester is retained by the holding assembly and has one electrode in electrically conductive contact with a ground terminal, each of the other electrode being in electrically conductive contact with one of the pair of line terminals. A cover is provided that is adapted to cooperate with the hollow housing open bottom or sealing the housing.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
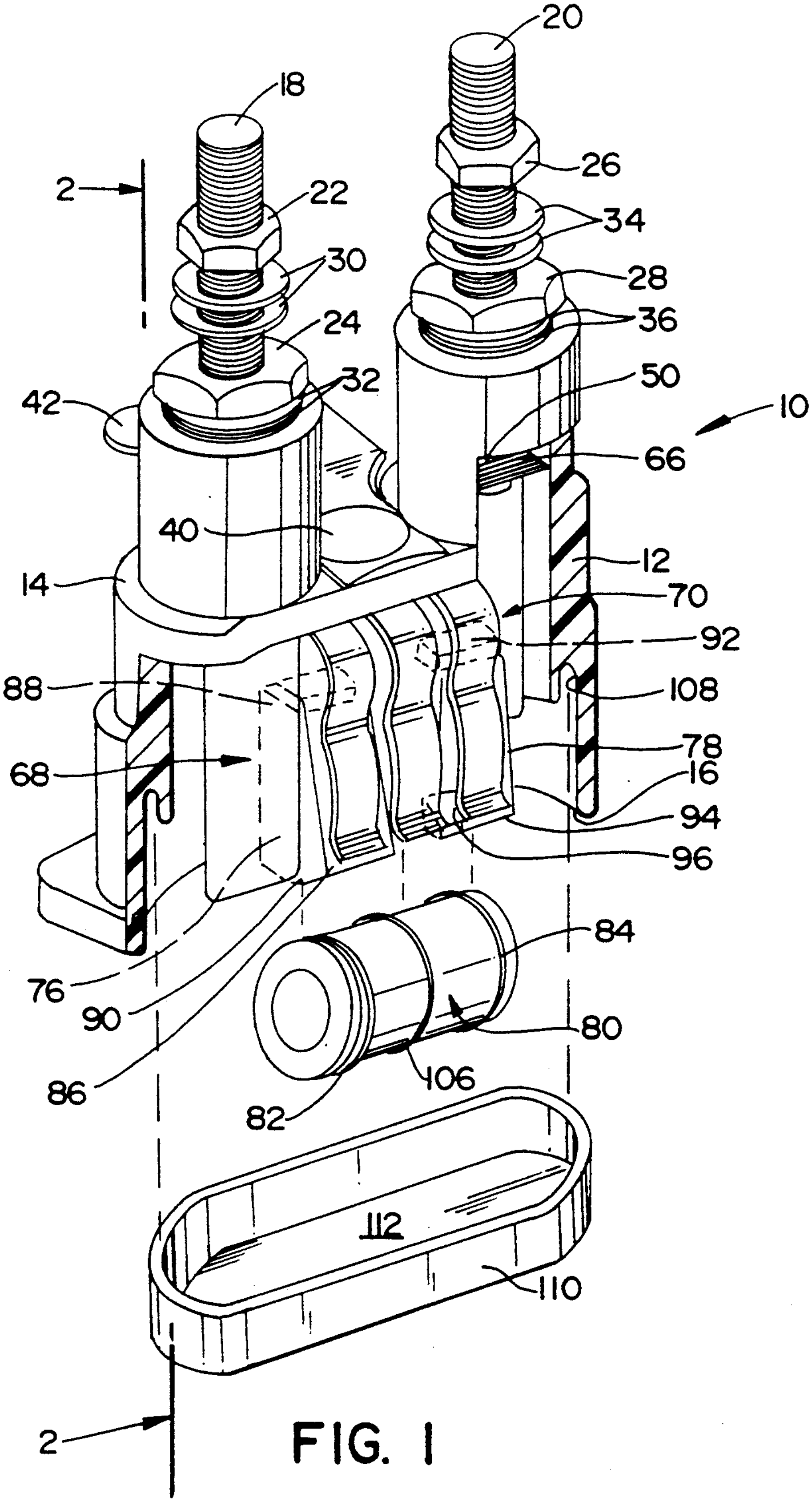
FIG. 1 is an exploded isometric view, according to the principle of the present invention, of a miniature station protector module.
Figure 2:
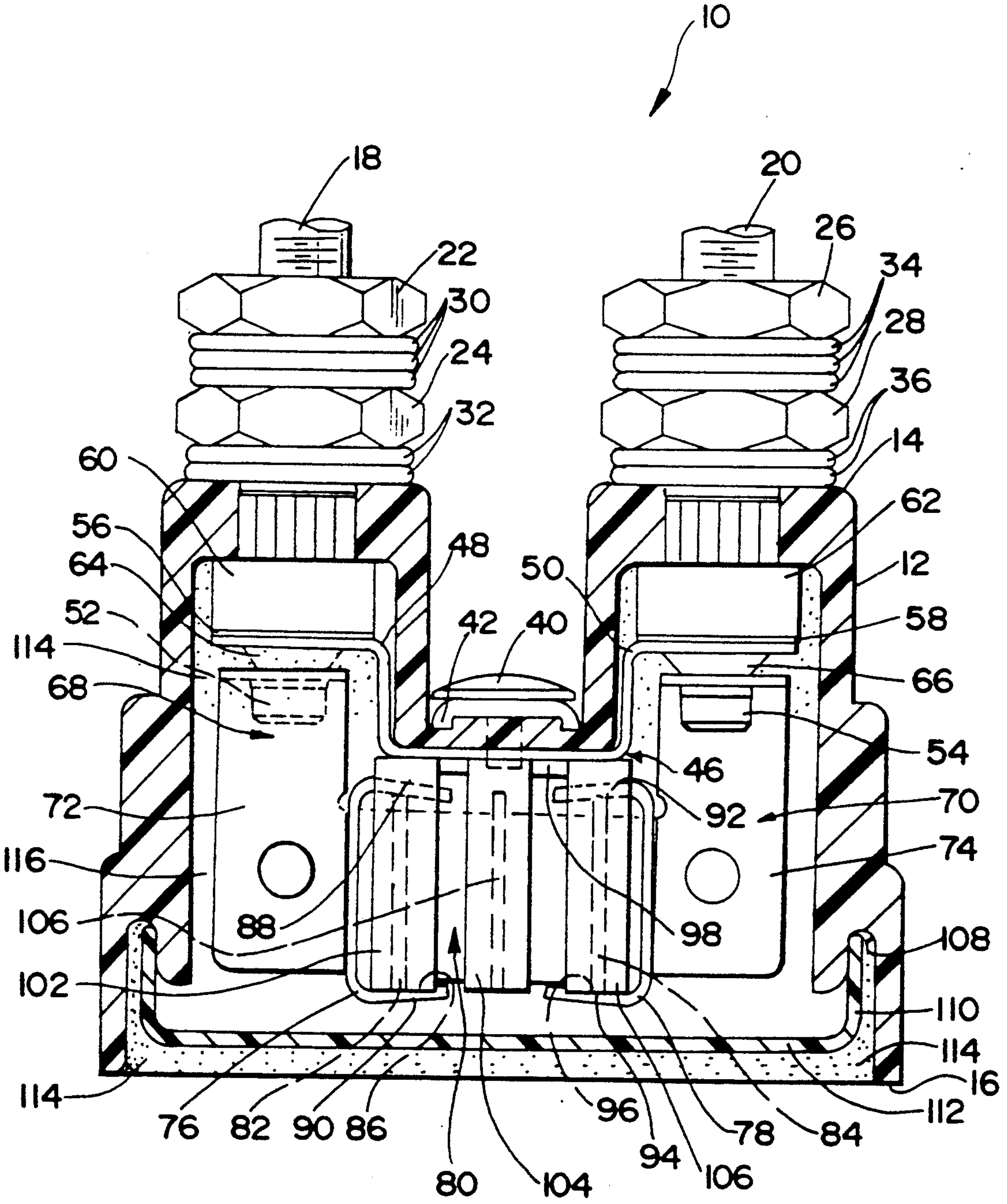
FIG. 2 is a cross-sectional view taken along the line 2—2 of FIG. 1.

Referring now to the figures, and in particular, to FIGS. 1 and 2 in which there is shown one embodiment of a miniature station protector module 10 that includes a hollow housing 12 having a closed top 14 an open bottom 16. Disposed in the top surface of the housing 12 are a pair of line terminals 18 and 20 onto which are connected the telephone company's communication lines, not shown, by means of nuts 22, 24, 26 and 28 and a plurality of flat washers 30, 32, 34 and 36, in a conventional manner. Disposed between the line terminals 18 and 20 is a ground terminal 40, which preferably includes ground tab 42, suitable for connection to a system ground, not shown.

The ground terminal 40 extends into the hollow or cavity 44 of the housing 12 and preferably is in the form of a rivet which when peened over, in a conventional manner, retains bracket 46 to the housing 12. A bracket 46 is provided with a pair of extending arms 48 and 50 that extend outwardly and are provided with an aperture therein, not shown, which is adapted to be received onto the lower portions 52 and 54 of terminals 18 and 20, respectively. The apertures provided in the extended arm portions 48 and 50 are sufficiently large so that there is no physical contact with the lower portions 52 and 54 of terminals 18 and 20 and they are prohibited from coming into electrically conductive contact with the shoulder portions 60 and 62 of the terminals 18 and 20, respectively, by a washer 56 and 58 made from a dielectric material. The dielectric material 56 and 58 is preferably approximately 3 mils in thickness and known under the trade name of Kapton, manufactured by DuPont of Delaware. The dielectric washers 56 and 58 are designed, in a conventional manner, to provide a voltage breakdown in the vicinity of 500 to 800 volts so that if the surge arrester device, being of the gas filled type was to loose its gaseous interior, it would breakdown at a voltage lower than the air gap provided within the gas tube surge arrester.

Additionally included on the lower portions 52 and 54 of terminals 18 and 20, respectively, is an insulated spacer 64 and 66 which prevents a second or holding bracket 68 and 70, which are force fit on the lower portion 52 and 54 of terminals 18 and 20, respectively.

Brackets 68 and 70 are provided with an extending portion 72 and 74 which extend in a downwardly direction away from the lower portion of terminals 18 and 20 and further include an end portion 76 and 78 that is generally U-shaped and adapted to receive an electrode of a surge arrester 80. Surge arrester 80 preferably is of the three electrode gas filled type having one electrode 82 in electrically conductive contact with holding bracket 68 if it were not for a thermosetting plastic material 86 preferably of a type known as Teflon F.E.P. Film, Type A 25067-11-2 manufactured by DuPont of Delaware placed over the electrode 82 preventing contact of the electrode 82 with the arms 88 and 90 of the U-shaped end portion 76 of holding bracket 68. Bracket 70 is identical to bracket 68 and it is affixed on the lower portion 54 of terminal 20 in a like manner and the arms 92 and 94 of end portion 78 of bracket 70 is prevented from coming into electrically conductive contact with electrode 84 of surge arrester 80 by the thermosetting plastic material 96.

Bracket 46 has incorporated thereon a second portion 98 which may be held in place by the ground terminal 40, or in a conventional manner affixed to the bracket 46 by soldering or similarly, and includes three finger-like members 102, 104 and 106 which are generally arcuate in shape and are adapted to receive surge arrester 80 within the finger-like members 100, 102 and 104 adapted to hold surge arrester 80 and be in electrically conductive contact with electrode terminals 82 and 84 if not for the thermosetting material 86 and 96 disposed between the finger-like members 100 and 102 and the electrodes 82 and 84. The finger-like member 104 is adapted to receive electrode 106 of surge arrester 80 and be in electrically conductive contact therewith thereby providing a ground connection for this electrode.

Preferably, the housing cavity 44 is filled with a potting material 114, (Polyurethane, manufactured by BIWAX, as type #653 and located in Illinois) until the lower portions 52 and 54 of terminals 18 and 20 are completely covered so that the back-up surge arrester comprising the shoulder portion 60 dielectric material 56 and arm 48 of bracket 46 is also covered and thus, is not subjected to any variations in atmosphere. In a similar manner, back-up surge protector protection is provided for the portion 62, other line terminal 20 by means of the shoulder dielectric material 58, and the arm portion 50 of bracket 46 which is also covered with the potting material.

The housing 12 is also provided with an inwardly circumferentially-disposed channel 108 which is adapted to receive the end lip portion 110 of the cover 112. When the end lip portion 110 of cover 112 is inserted into channel 108 and thereafter held in place by the potting material the housing 12 is completely sealed leaving an air chamber 116 within the housing.

Figure 3:
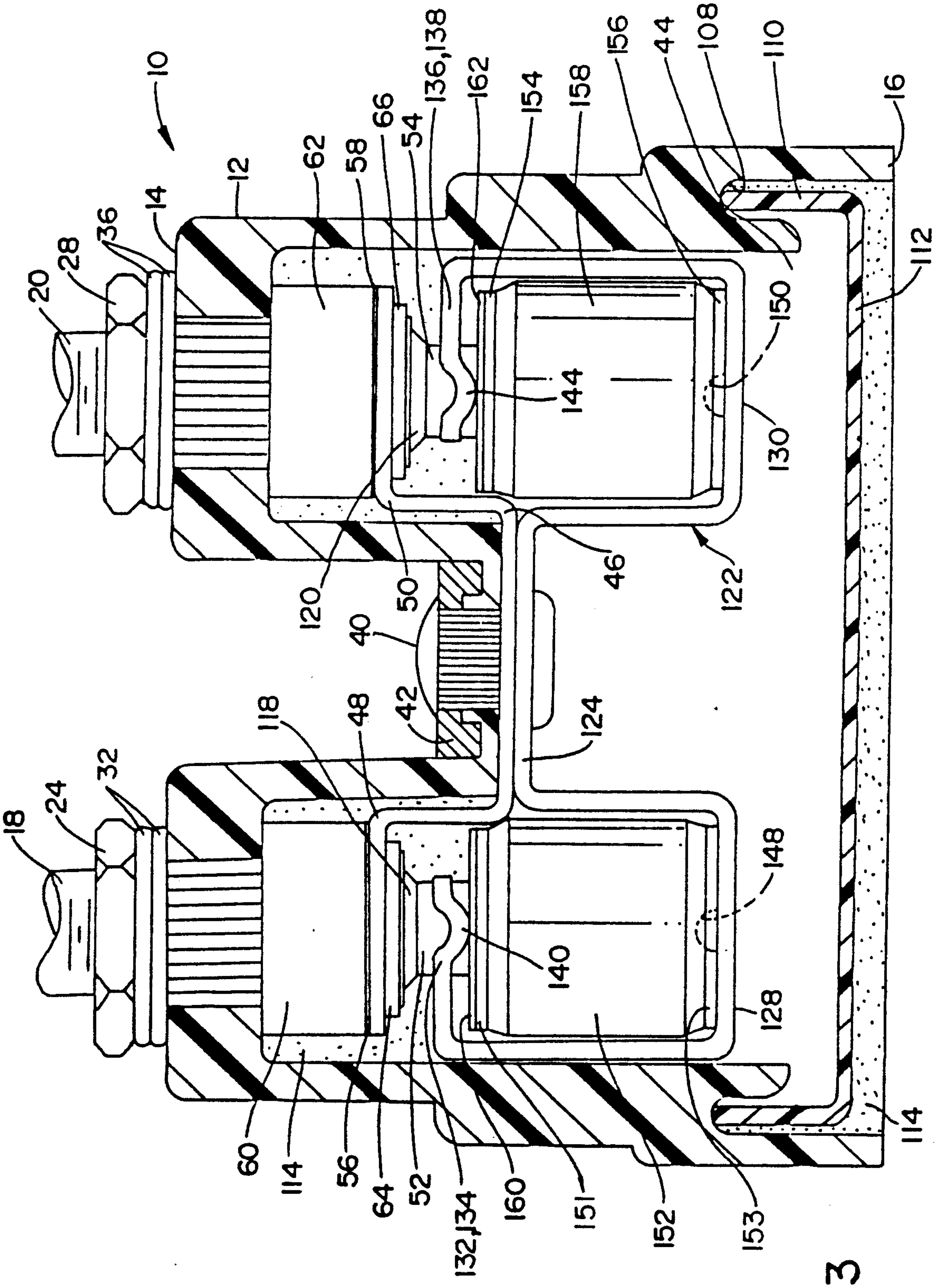
FIG. 3 is a cross-sectional view of an alternative embodiment of the present invention taken essentially along the line 2—2 of FIG. 1.

Referring now to FIG. 3 which shows an alternative embodiment of the station protector module 10 that includes the housing 12 having a top portion 14 and an open bottom 16 with an internally circumferentially disposed channel 108 provided proximate the end portion 16 of the housing 12. The cover 112 has a lip portion 110 adapted to be received into the channel 108 in the same manner as indicated in the first embodiment. Terminals 18 and 20 with ground terminal 40 disposed therebetween each extend into the hollow cavity 44 in the same manner as described in the earlier embodiment.

Bracket 46 has extending arms positioned over the lower portion 52 and 54 of terminals 18 and 20, respectively, and is prevented from coming into electrically conductive contact with the shoulder portions 60 and 62 of terminals 18 and 20 by the dielectric material 56 and 58 in a manner similar to that described in the earlier embodiment. The insulators 64 and 66 hold the assembly in position are held in position and by the aid of the force-fit captive nuts 118 and 120 provided on the terminals 18 and 20, respectively, thereby maintaining the back-up surge arrester in axial alignment with the terminals, in a manner similar to that described in the earlier embodiment.

The ground terminal 40, preferably utilizing a rivet, retains a second bracket 122 when it is peened over holding the second bracket 122 in position.

Figure 4:
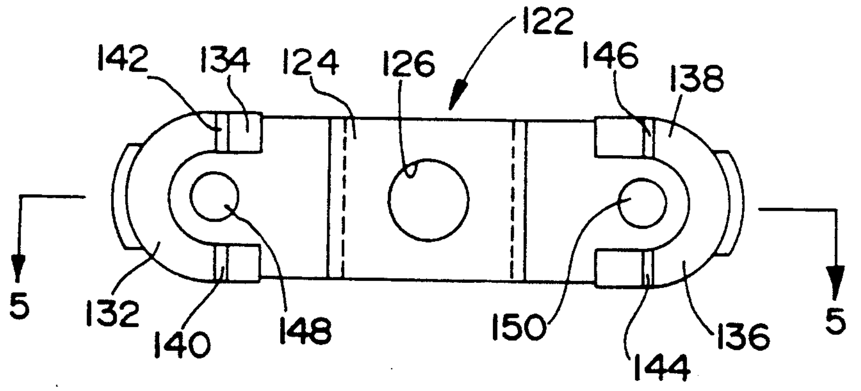
FIG. 4 is a top plan view of the holding bracket utilized in the embodiment shown in FIG. 3.
Figure 5:
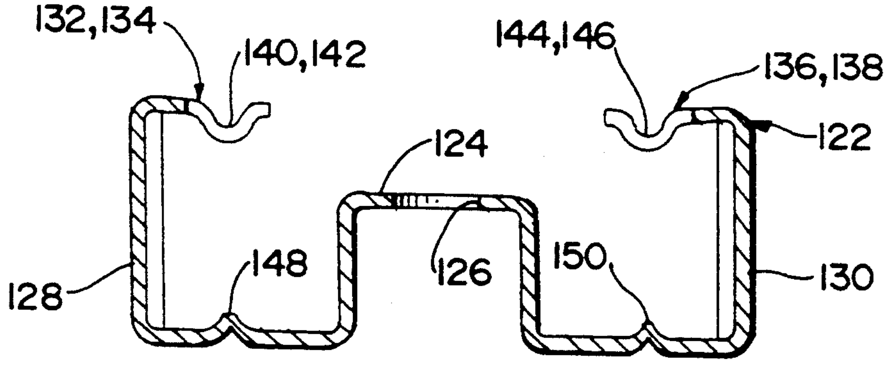
FIG. 5 is a cross-sectional view in elevation of the holding bracket shown in FIG. 4 taken along the line 5—5.
Figure 6:
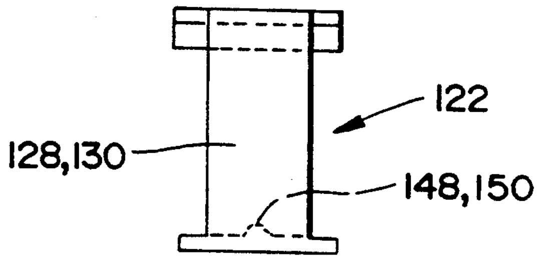
FIG. 6 is an end view in elevation of the holding bracket shown in FIG. 4.

The bracket 122 is more clearly shown in FIGS. 4, 5 and 6 and includes a central portion 124 into which is provided aperture 126 through which the rivet or ground terminal 40 is received. The extending arm portions 128 and 130 are generally rectangularly-shaped with the top portion thereof forming a pair of fingers 132 and 134; 136 and 138 on portions 128 and 130, respectively, on the bracket 122. The fingers 132, 134, 136 and 138 are provided with dimples 140, 142, 144 and 146, respectively, on the extending arm portions 128 and 130 in addition to a pair of dimples 148 and 150 to insure-electrically conductive contact with the electrodes 151 and 153 of the surge arrester 152 and electrodes 154 and 156 of surge arrest 158, respectively. The electrode 148 and the electrode 154 would be in electrically conductive contact with the dimples 140, 142, 144 and 146 of bracket 122 if it were not for a thermosetting plastic washers 160 and 162 disposed between the electrodes and the bracket dimples in order to prevent such contact. The other or remaining electrode 150 and electrode 156 are in electrical conducting contact with the bracket 122 and thus, in electrically conductive contact with the ground terminal 40.

As shown, the embodiment in FIG. 3 includes two surge arresters 152 and 158 which may be of the gas filled type or may be of solid state construction. One electrode of each of the surge arresters are in electrically conductive contact with each other and the ground terminal. The lower portions 52 and 54 of electrodes 18 and 20, respectively, are in intimate electrical conducting contact with the electrodes 148 and 154 of the surge arresters 152 and 158, respectively.

Prior to placing the cover 112 on the housing 12 the potting material 114 is used to cover the lower portion of the terminals 18 and 20 as explained earlier. Once the cover 112 is inserted with the lip portion 110 into the channel 108 and the potting material 114 is applied on top of the cover a complete seal of the internal members of the station protector is accomplished.

In operation, the surge arresters are connected across the terminal communication line pairs, via the terminals 18 and 20. Should an overvoltage or surge occur on the line an arc over will occur and the surge arresters will protect the communication line. If the gas filled surge arresters were to lose their gas filling, then the back-up surge arrester would arc over protecting the communication equipment. If an unusual amount of heat is is caused by the arc over then the thermosetting material would melt causing a fail-safe short to ground on the line. A service technical would then remove the station protector module when he discovers the shorted unit, throw it away and replace it with a completely new unit. No attempt is made to repair the surge arresters once a fault has been determined therewith.

Assembly of both embodiments described herein are made in a similar manner.

Hereinbefore has been disclosed a station protector module which is reliable, efficient and inexpensive to manufacture. It will be understood that various changes in the details, materials, arrangement of parts and operating conditions which have been herein described and illustrated in order to explain the nature of the invention, may be made by those skilled in the art within the principles and scope of the instant invention.

Having thus set forth the nature of the invention, what is claimed is:

1. A miniature station protector module for communication systems, comprising:

(a) a hollow housing having a top surface bottom;

(b) a pair of line terminals and a ground terminal disposed in said housing top surface extending inside said hollow housing, said ground terminal being intermediate said pair of line terminals;

(c) back-up surge arrester means disposed on each one of said pair of line terminals in axial alignment therewith, each said line terminal extending through said housing and being in direct contact with said back-up surge arrester;

(d) holding assembly means affixed to said ground terminal within said hollow housing adapted to receive a surge arrester means;

(e) said surge arrester means having at least a pair of electrodes, one of said electrodes being in electrically conductive contact with said ground terminal, another of said electrodes being in electrically conductive contact with one of said pair of line terminals; and (f) means adapted to cooperate with said hollow housing open bottom for sealing said housing.

2. A miniature station protector module for communication systems according to claim 1, wherein said holding assembly means comprises:

(a) a first bracket means having a pair of extending arms, each one of said pair of arms extending towards one of said pair of line terminals, said first bracket being prevented from electrically conductive contact with each said line terminal by a dielectric spacer of said back-up; and (b) second bracket means, said second bracket means being adapted to receive said surge arrester means providing electrically conductive contact with said ground terminal and said one electrode of said surge arrester means.

3. A miniature station protector module for communication systems according to claim 2 further including a heat sensitive plastic material disposed between said surge arrester means other electrode and said second bracket means.

4. A miniature station protector module for communication systems according to claim 2 further including insulating means disposed between said second bracket means and said first bracket means on each said line terminal for preventing electrically conductive contact between said first and second bracket means.

5. A miniature station protector module for communication systems according to claim 1 wherein said surge arrester means is a three electrode device having two independent breakdown paths.

6. A miniature station protector module for communication systems according to claim 5 wherein said surge arrester means is gas filled.

7. A miniature station protector module for communication systems according to claim 1 wherein said surge arrester means includes a pair of two electrode devices, wherein one electrode of each two electrode device is in electrically conductive contact with one electrode of the other device.

8. A miniature station protector module for communication systems according to claim 7 wherein said surge arrester means is gas filled.

9. A miniature station protector module for communication systems according to claim 1 further including potting material disposed within said hollow housing.

10. A miniature station protector module for communication systems according to claim 9 wherein the portion of said terminals disposed within said housing are covered by a potting material.

11. A miniature station protector module for communication systems, comprising:

(a) a hollow housing having a top surface and an open bottom;

(b) a pair of line terminals and a ground terminal disposed in said housing top surface extending inside said hollow housing, said ground terminal being intermediate said pair of line terminals;

(c) back-up surge arrester means disposed on each one of said pair of line terminals in axial alignment therewith;

(d) holding assembly means affixed to said ground terminal within said hollow housing adapted to receive said surge arrester means, said holding assembly means including;

(i) a first bracket means having a pair of extending arms, each one of said pair of arms extending towards one of said pair of line terminals, (ii) dielectric spacer means for preventing said first bracket means from being in electrically conductive contact with each said line terminal, and (iii) second bracket means, said second bracket means being adapted to receive said surge arrester means providing electrically conductive contact with said ground terminal and said one electrode of said surge electrode means;

(e) surge arrester means having at least a pair of electrodes, one of said electrodes being in electrically conductive contact with said ground terminal, the other of said electrodes being in electrically conductive contact with one of said pair of line terminals; and (f) means adapted to cooperate with said hollow housing open bottom for sealing said housing.

12. A miniature station protector module for communication systems according to claim 11 wherein said surge arrester means is a three electrode device having two independent breakdown paths and is gas filled.

13. A miniature station protector module for communication systems according to claim 11 wherein said surge arrester means includes a pair of two electrode devices and said surge arrester is gas filled wherein one electrode of each two electrode device is in electrically conductive contact with one electrode of the other device.

14. A miniature station protector module for communication systems according to claim 11 further including potting material disposed within said hollow housing.

15. A miniature station protector module for communication systems according to claim 14 wherein the portion of said terminals disposed within said housing are covered by a potting material.

16. A miniature station protector module for communication systems according to claim 11 further including a heat sensitive plastic material disposed between said surge arrester other electrode and said second bracket means.

17. A miniature station protector module for communication systems according to claim 11 wherein said means for sealing said housing includes a cover.

18. A miniature station protector module for communication systems according to claim 17 wherein said hollow housing is provided with an internally circumferentially disposed channel adapted to cooperate with and receive a cover means.

19. A miniature station protector module for communication systems according to claim 18 wherein said cover means is held in place in said housing open bottom with a potting material leaving an internal air space surrounding said surge arrester means.

20. A miniature station protector module for communication systems, comprising:

(a) a hollow housing having a top surface and an open bottom;

(b) a pair of line terminals and a ground terminal disposed in said housing top surface extending inside said hollow housing, said ground terminal being intermediate said pair of line terminals;

(c) back-up surge arrester means disposed on each one of said pair of line terminals in axial alignment therewith;

(d) holding assembly means affixed to said ground terminal within said hollow housing adapted to receive said surge arrester means, said holding assembly means including;

(i) a first bracket means having a pair of extending 1 arms, each one of said pair of arms extending towards one of said pair of line terminals, (ii) dielectric spacer means for preventing said first bracket means from being in electrically conductive contact with each said line terminal, and (iii) second bracket means, said second bracket means being adapted to receive said surge arrester means providing electrically conductive contact with said ground terminal and said one electrode of said surge electrode means;

(e) surge arrester means having at least a pair of electrodes, electrodes being in electrically conductive contact with said ground terminal, each one of another of said electrodes being in electrically conductive contact with one of said pair of line terminals;

(f) a heat sensitive plastic material disposed between said surge arrester other electrode and said second bracket means; and (g) means adapted to cooperate with said hollow housing open bottom for sealing said housing.

21. A miniature station protector module for communication systems according to claim 20 wherein said means for sealing said housing includes a cover.

22. A miniature station protector module for communication systems according to claim 1 wherein said means for sealing said housing includes a cover.

23. A miniature station protector module for communication systems according to claim 22 wherein said hollow housing is provided with an internally circumferentially disposed channel adapted to cooperate with and receive a cover means.

24. A miniature station protector module for communication systems according to claim 23 wherein said cover means is held in place in said housing open bottom with a potting material leaving an internal air space surrounding said surge arrester means.

25. A miniature station protector module for communication systems, comprising:

(a) a hollow housing having a top surface and an open bottom;

(b) a pair of line terminals and a ground terminal disposed in said housing top surface extending inside said hollow housing, said ground terminal being intermediate said pair of line terminals;

(c) back-up surge arrester means disposed on each one of said pair of line terminals in axial alignment therewith;

(d) holding assembly means affixed to said ground terminal within said hollow housing adapted to receive a surge arrester means, said holding assembly means including;

(i) a first bracket means having a pair of extending arms, each one of said pair of arms extending towards one of said pair of line terminals, said first bracket being prevented from electrically conductive contact with each said line terminal by a dielectric spacer of said back-up surge arrester means; and (ii) second bracket means, said second bracket means being adapted to receive said surge arrester means providing electrically conductive contact with said ground terminal and said one electrode of said surge arrester means.

(e) said surge arrester means having at least a pair of electrodes, one of said electrodes being in electrically conductive contact with said ground terminal, another of said electrodes being in electrically conductive contact with one of said pair of line terminals; and (f) means adapted to cooperate with said hollow housing open bottom for sealing said housing.

* * * * *